United States Patent [19]

Wolowodiuk

[11] 3,870,099
[45] Mar. 11, 1975

[54] SEAL ASSEMBLY
[75] Inventor: Walter Wolowodiuk, New Providence, N.J.
[73] Assignee: The United States of America as represented by the United States Atomic Energy Commission, Washington, D.C.
[22] Filed: May 19, 1972
[21] Appl. No.: 254,973

[52] U.S. Cl.................. 165/82, 165/158, 277/62
[51] Int. Cl............................. F28f 9/22, F28f 7/00
[58] Field of Search ............ 277/61, 62; 165/81, 82, 165/83; 285/375

[56] References Cited
UNITED STATES PATENTS
2,670,185   2/1954   Schorner et al. ................. 165/83 X
3,433,488   3/1969   Grantom............................. 277/62
3,547,202   12/1970  Ticknor .............................. 165/81

Primary Examiner—Samuel B. Rothberg
Attorney, Agent, or Firm—John E. Wilson; Marvin A. Naigur

[57] ABSTRACT

An annular seal assembly between concentric sidewalls which will not prevent the sidewalls from being moved axially with respect to one another. The seal assembly is positioned by two lips, one on each sidewall and has a seal wall engaging one of the lips, a sealing ring engaging against the seal wall, the sealing ring being urged away from the lip on which said sealing wall is mounted and towards the other lip and a seating surface which is connected with the other lip and moveable away from the sealing ring when the other lip is moved axially.

3 Claims, 4 Drawing Figures

SEAL ASSEMBLY

SOURCE OF THE INVENTION

This invention was made in the course of or under a Contract with the U.S. Atomic Energy Commission.

BACKGROUND OF THE INVENTION

There are instances where it is necessary to provide an annular seal between two concentric sidewalls to create two contiguous coaxial spaces which cannot communicate through the seal. An example of such a situation is found in heat exchangers where a tube bundle within a flow shroud is placed within a cylindrical shell. The space between the flow shroud and the shell is often used as an annular conduit for fluid or as an annular space to contain a layer of stagnant fluid. It is often necessary to divide the annular space between the shroud and shell so that a stagnant layer is separated from a space which is used to flow fluid or to separate two spaces which are used to flow fluid from each other.

In such cases, accessibility to the seal is limited and therefore, it is rather difficult to repair or maintain the seal assembly. Further, it is desirable that the tube bundle be easily removed for maintenance or repair and the provision of a seal between the shroud of the tube bundle and the shell will prevent the easy removal of the tube bundle unless the seal is specially designed.

In spite of the requirements for the seal which are set forth above, the seal must be a rugged one.

SUMMARY OF THE INVENTION

It is an object of the present invention to solve problems such as those discussed above. Accordingly, a seal between two concentric sidewalls is created by providing lips on each of the sidewalls, one of the lips engaging a seal wall projecting toward the other lip, the other lip being connected with, in a sealing arrangement, a seating surface which engages against a seal ring which in turn is in a sealing engagement with said seal wall and is biased by a spring toward the seating surface.

DETAILED DESCRIPTION OF THE PREFERRED EMBODIMENT

Figure 1:
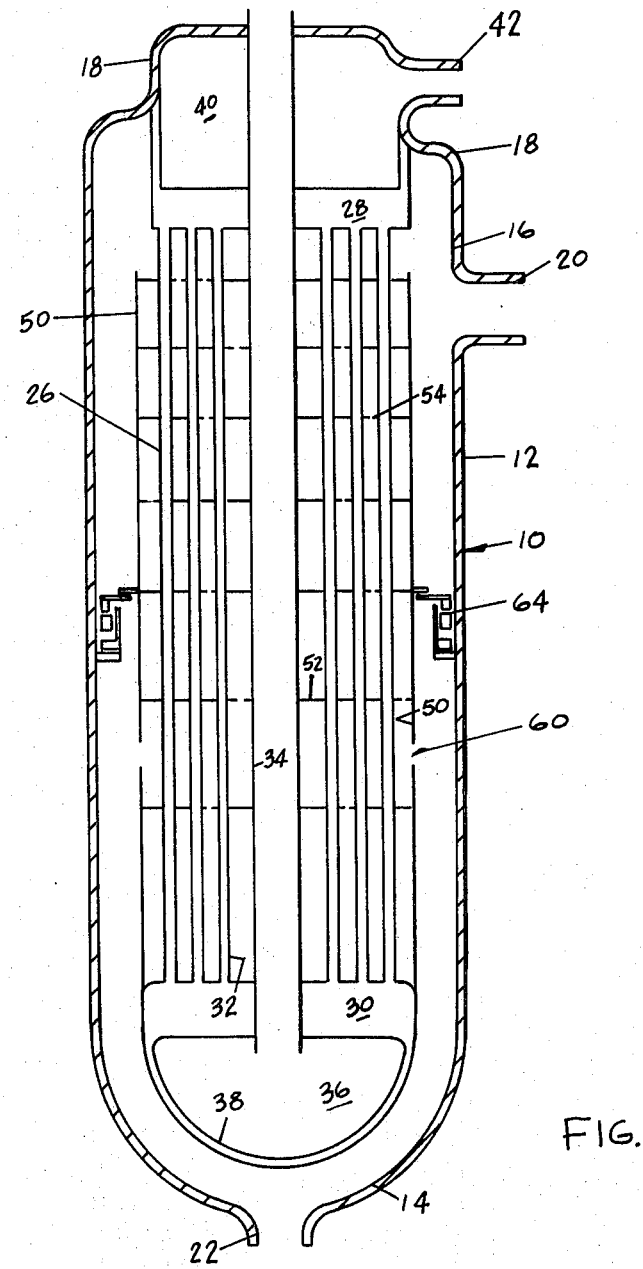
FIG. 1 shows a heat exchanger of the type in which the present seal assembly could be beneficially employed.

A heat exchanger indicated generally as 10 is shown in FIG. 1 with a generally cylindrical sidewall 12 which is contoured inwardly at the bottom 14 and which mergers at its top 16 with a head section 18. The shell 12 has a primary fluid inlet 20 on one side adjacent to the top thereof and a primary fluid outlet 22 in the middle of the contoured bottom 14.

Within the shell 12 is a inner core 26 which includes an upper tube sheet 28 a lower tube sheet 30 and a plurality of tubes 32 which extend between those tube sheets. The inner core 26 has a central conduit 34 which projects through the top of the head section 18, down through the tube sheets 28 and 30 to a location slightly below the tube sheet 30. The bottom of the central conduit 34 actually is within a chamber 36 which is defined by the tube sheet 30 and a dish-shaped plate 38 which at its edges, merges with the tube sheet 30.

Secondary fluid coming down the central conduit 34 and into the chamber 36 will reverse its direction to flow upwardly through the tube sheet 30 and the tubes 32 until it passes through the upper tube sheet 28 and into the upper chamber 40 immediately above the tube sheet 28 and below the head section 18. The fluid then flows outwardly through the secondary fluid outlet 42 in the head section 18.

The inner core 26 includes a cylindrical flow shroud 50 which extends from the lower tube sheet 30 to a level slightly below the upper tube sheet 28 and slightly above the primary inlet 20. The shroud 50 is substantially the same diameter as the tube sheets 28 and 30 and encircles the tubes 32 which are distributed in the annular space between the flow shroud 50 and the central conduit 34. The tubes 32 are supported and maintained in proper spaced relation by a series of annular supports 52 which are parallel to the tube sheets 28 and 30, are spaced between those tube sheets and extend from the central conduit 34 to the flow shroud 50. The supports 52 each have openings 54 which allow primary fluid to flow through the supports 52 and parallel to the tubes 32.

Thus, primary fluid entering at the inlet 20 will enter an annular chamber 56 which surrounds the shroud 50 above a ring 58 extending between the shroud 50 and the shell 12 at a level slightly below the inlet 20. The primary fluid will then flow upwardly over the top of the shroud 50 and down within it through the openings 54 and the plates 52 until it flows outwardly through openings 60 in the shroud 50 at a level in the bottom portion of the inner core 26. The primary fluid will then flow downwardly between the shroud 50 and the shell 12 and between the plate 38 and bottom 14 of the shell 12 to leave by the primary fluid outlet 22.

In order to separate the primary fluid leaving the inner core 26 through the openings 60 from fluid which has not yet transferred heat to the tubes 34, an annular seal 64 between the shroud 50 and shell 12 is provided at a location slightly above the opening 60. It should be appreciated that if any leakage occurs through the ring 58, the primary fluid coming through that ring will not bypass the inner core 26 because of the existance of the seal ring 64. It may in fact be advantageous to allow some communication through the ring 58 to create a stagnant annular body of sodium between the ring 58 and seal 64 and the shroud 50 and shell 12. It is necessary, however, to seal the space above the seal assembly 64 off from the space below it so that primary fluid leaving through the opening 60 after having given up its heat to the secondary fluid flowing through the tubes 32 is lead out of the heat exchanger 10 so that it may be reheated and reused as a source of heat.

Figure 2:
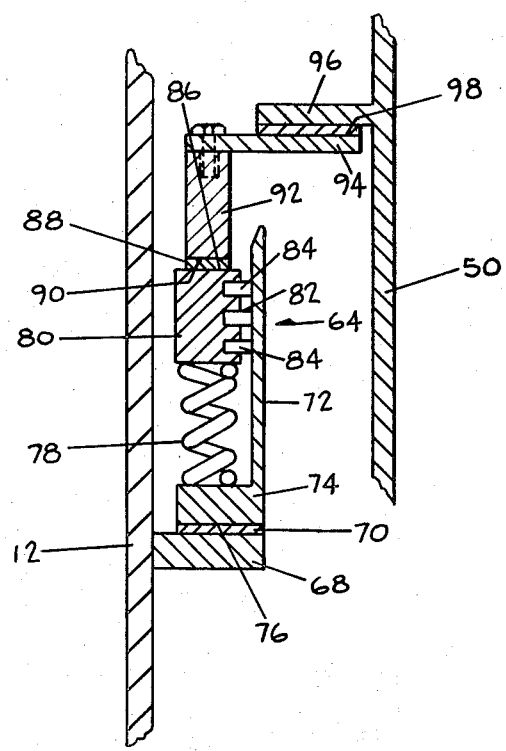
FIG. 2 is a view in enlarged scale of the seal assembly and surrounding structure, partly in section and in enlarged scale.

A seal assembly 64 is shown in FIG. 2. The seal assembly 64 is positioned between the outer shell 12 and the shroud 50 as has already been explained. An annular lip 68 engages at its outer end with the inner surface of the outer shell 12. The top surface of the lip 68 is covered in part by a gasket 70 which is annular in configuration and which supports a seal wall 72 which has a foot portion 74 which extends outwardly from the bottom of the seal wall 72 and which has a flat surface at the bottom 76 thereof so that the gasket 70 acts as an effective seal between the ring 68 and the foot portion 74 of the seal wall 72. Projecting up from the foot portion 74 and generally parallel with the shell 12 is a spring 78 which is connected at its upper end to a seal ring 80. The seal ring 80 at its inner side has annular grooves 82 each of which holds a pressure ring 84 each of which engage against the outside surface of the sealing wall 72. The pressure rings 84 act in a fashion similar to the piston rings of a car, that is, they withstand a large pressure drop to prevent leakage between the sealing ring 80 and the sealing wall 72.

The top surface 86 of the sealing ring 80 engages against a gasket 88 on the bottom or seating surface 90 of an upwardly extending cylindrical seating member 92. The spring 78 urges the ring 80 upwardly and against the member 92 which is secured from movement by an annular plate 94 which at is outer marginal portion is bolted to the member 92 and which at its inner marginal portion is secured from movement by a lip 96 on the shroud 50. The lip 96 is annular and projects outwardly from the shroud 50. Between the lip 96 and the plate 94 is an annular gasket 98 which provides a seal between the plate 94 and the lip 96. The seal assembly 64 will inherently withstand pressure increases from the annular space between the shroud 50 and the shell 12 below the seal assembly 64. Because the area of the sealing wall 72 which is exposed to the pressure increase is far greater than the area thereof which is not, the sealing wall will tend to move outwardly and against the sealing ring 80. The pressure increase should have no effect on the force between the seating member 92 and the sealing ring 80 and the only effect a pressure increase would have on the seal between the member 94 and the lip 96 would be to increase the force exerted by those elements on the gasket 98, that is, a pressure increase would actually increase the effectiveness of the seal.

In spite of the inherent good sealing characteristics of the seal assembly 64, it will not prevent easy removal of the inner core 26 because axial movement of the shroud 50 upward (as shown in FIG. 2) will not be resisted.

Figure 3:
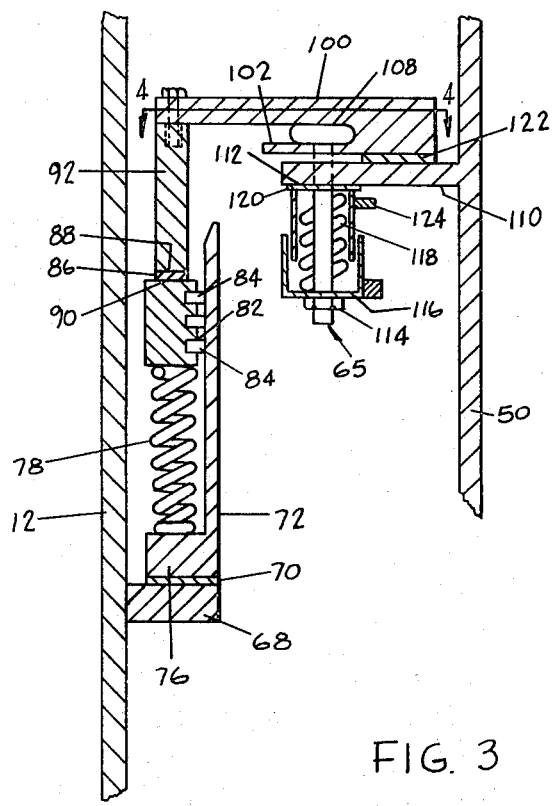
FIG. 3 is a view of a second embodiment of the present seal assembly with adjacent structure and substantially in section to the same scale as FIG. 2.

A second embodiment is shown in FIG. 3. There, the seal assembly indicated generally as 65 is one which permits easy removal of the inner core 26 just as does the embodiment shown in FIG. 2, but also allows for a bypass through the seal assembly 65 in the event of a sudden pressure build-up below. A pressure build-up in the annular space below the seal assembly 65 can occur, for example, when a check valve in the line below the primary fluid outlet 22 should slam shut. In such cases, there is a maximum safe pressure which can be tolerated and in order to prevent material failure, it is often desirable that the seal assembly 65 open to accommodate the pressure surge.

Figure 4:
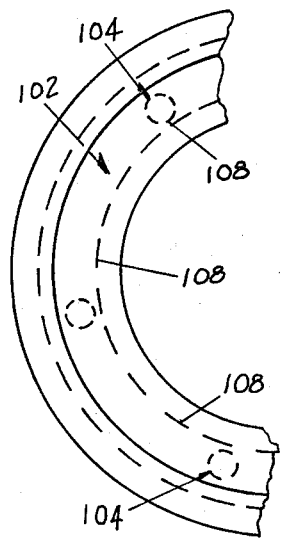
FIG. 4 is a view partly in section taken substantially along the line 4—4 in FIG. 3.

In the embodiment of FIG. 3, the seal assembly 65 is similar to the seal assembly 64 in that elements which are provided with the same reference numerals in both figures function similarily and are the same in structure. The annular member 94 is omitted from the embodiment of FIG. 3 and a member 100 is substituted for it. This member is considerably thicker at its inner portion, the added thickness being added to the bottom of the member 100. An annular slot 102 which extends inwardly from the outer end of the thickened portion is shown in FIG. 3. As shown in FIG. 4, a plurality of inwardly extending slots 104 are spaced about the periphery of the member 100. The slots 104 extend completely through the portion of the member 100 which lies immediately below the slot 102. The slots 102 and 104 allow for easy insertion of bolts 106, the heads 108 thereof being moved inwardly through the slot 102 so that each bolt can extend through one of the slots 104. To further accommodate the bolts 106, the lip 110 on the shroud 50 is provided with a series of inwardly extending slots 112 which allow the bolts 106 to project through the lip 110. Each of the bolts 106 has a nut 114 which supports a spring plate 116 which in turn engages the bottom of a spring 118 which is urged upwardly and against a spring washer 120 which engages against the bottom of the lip 110.

A gasket 122, which is annular in configuration, is placed between the member 100 and the lip 110 and the gasket is compressed because the spring 118 pushes downwardly on the spring plate 116 and thus the bolt 106 so that the head 108 of the bolt 106 pulls downwardly on the member 100 to compress the gasket 122 between the lip 110 and the member 100.

An annular seating member 92 is bolted at its top to the outer marginal portion of the member 100.

In operation, the compression in the spring 118 is set so that at a predetermined pressure surge, the primary fluid pushing upwardly and outwardly against the members 100 and 92 will force the member 100 away from the lip 110 and the member 92 away from the ring 80. As soon as the pressure has been releived to a point at or below the predetermined pressure, the compression in the spring 118 will be sufficient to return the members 100 and 92 to their original position to once again provide a seal between the spaces above and below the seal assembly 65.

The embodiment of FIG. 3 also affords a seal assembly which will automatically disconnect when the inner core 26 is moved axially. Thus, if the shroud 50 moves upwardly as shown in FIG. 3, the seating member 92 will disengage from the ring 80. Once the inner core 26 has been removed, it is a simple matter to loosen each of the nuts 114 of the bolts 106, or to move lips 124 (each of which is connected with an end portion of the spring 118) together to compress the spring 118, then move the bolts 106 outwardly and thus free the member 100 from the lip 110. It will be apparent that once this is accomplished, it is an easy matter to disassemble the seal assembly 65 so that any part therein can be inspected, repaired or replaced.

The foregoing describes but one preferred embodiment of the present invention, further embodiments being possible without exceeding the scope thereof as defined in the following claims.

What is claimed is:

1. A heat exchanger comprising:
   a cylindrical side wall;
   a primary fluid inlet in said side wall;
   a primary fluid outlet in said side wall below said primary fluid inlet;
   an inner core, said inner core comprising:
      an upper tube sheet;
      a plurality of heat exchange tubes extending downward from said upper tube sheet for flowing a secondary fluid;

a cylindrical shroud encircling said heat exchange tubes, and extending substantially over the entire length of said heat exchange tubes, said shroud being coaxial with and within said side wall;

a seal assembly positioned between said side wall and said shroud below said primary fluid inlet comprising:

a first annular lip extending inward from said side wall toward said shroud;

an annular vertical seal wall connected at its bottom with said lip in a fluid tight connection;

a seal ring encircling said seal wall, said seal ring having a plurality of annular grooves in its inner surface and a plurality of pressure rings held within said grooves and engaging against the outer vertical surface of said seal wall;

a plurality of first springs between said lip and said seal ring;

a second annular lip projecting outward from said shroud at a level higher than the level of said first annular lip;

a horizontal annular plate extending above said second lip;

a first annular gasket held between said second lip and said horizontal annular plate;

a cylindrical seating member extending downward from said annular plate, said cylindrical seating member secured to said annular plate at the outer marginal portion of said annular plate;

a second annular gasket engaging the bottom of said cylindrical seating member and the top of said seal ring;

a plurality of second springs connected with said annular horizontal plate and said second annular lip urging said annular horizontal plate downward so that said first gasket is compressed between said second lip, and said horizontal annular plate and said second gasket is compressed between the bottom of said seating member and the top of said seal ring whereby when said primary fluid flows through said primary fluid inlet the annular space between said shroud and said side wall above said seal assembly will be filled with fluid and primary fluid and will flow downward through said cylindrical shroud to below said seal assembly and then out through said primary fluid outlet and whereby when a surge of pressure urging said primary fluid to flow from said primary fluid outlet into said heat exchanger occurs, said second springs will extend when said pressure reaches a predetermined value to allow said horizontal annular plate and said cylindrical seating member to move upward, so that said first annular gasket and said second annular gasket will no longer be compressed to allow primary fluid to flow upward through said seal assembly into the space above said seal assembly between said shroud and said side wall.

2. The heat exchanger defined in claim 1 wherein said annular vertical seal wall includes an inwardly extending horizontal foot at the bottom of said annular vertical seal wall, with said foot resting on said first annular lip and said first springs compressed between the top of said foot and the bottom of said seal ring.

3. The heat exchanger defined in claim 2 further comprising a plurality of bolts said bolts being secured at their upper end to said horizontal annular plate, and a spring plate secured at the bottom of each bolt each of said second springs encircling one of said bolts and each being compressed between one of said spring plates and said second lip.

* * * * *